United States Patent
Tucker

[15] 3,661,356
[45] May 9, 1972

[54] INLET VALVE ASSEMBLY FOR PNEUMATIC SYSTEM

[72] Inventor: Council A. Tucker, Glendale, Calif.
[73] Assignee: Natter Manufacturing Corporation, Temple City, Calif.
[22] Filed: Feb. 9, 1970
[21] Appl. No.: 9,892

[52] U.S. Cl. .......................... 251/299, 137/360, 285/210
[51] Int. Cl. .......................... F16k 1/16, F16l 5/00
[58] Field of Search .......................... 137/360; 251/299, 303; 285/203, 189, 208, 209, 210, 202, 205, 238, 158, 194, 192, 201, 204; 85/1 H, 1 K, 32 K; 151/41.7

[56] References Cited

UNITED STATES PATENTS

| | | | |
|---|---|---|---|
| 2,241,293 | 5/1941 | Campbell | 285/208 X |
| 2,695,793 | 11/1954 | Minton | 285/194 X |
| 2,799,518 | 7/1957 | Anderson et al. | 285/194 X |
| 3,232,644 | 2/1966 | Pfeifer et al. | 285/203 X |
| 1,131,399 | 3/1915 | McGinley | 285/203 X |
| 3,036,814 | 5/1962 | Stevens | 251/299 |
| 3,291,927 | 12/1966 | Riley et al. | 137/360 X |
| 3,325,193 | 6/1967 | Castello | 285/189 |
| 3,468,334 | 9/1969 | Hamrick | 137/360 X |

Primary Examiner—Henry T. Klinksiek
Attorney—Sellers and Brace

[57] ABSTRACT

An inlet valve assembly for a pneumatic system having a mounting plate securable to a room wall. A one piece tubular inlet member is provided with integral keeper means for holding it detachably assembled to the mounting plate and provides a valve seat for a valve member mounted on the inner side of a pivoting cover plate for the assembly. A concealed control switch for the pneumatic system is operated automatically by opening and closing the cover plate.

9 Claims, 8 Drawing Figures

PATENTED MAY 9 1972
3,661,356
INVENTOR
COUNCIL A. TUCKER
BY
ATTORNEYS
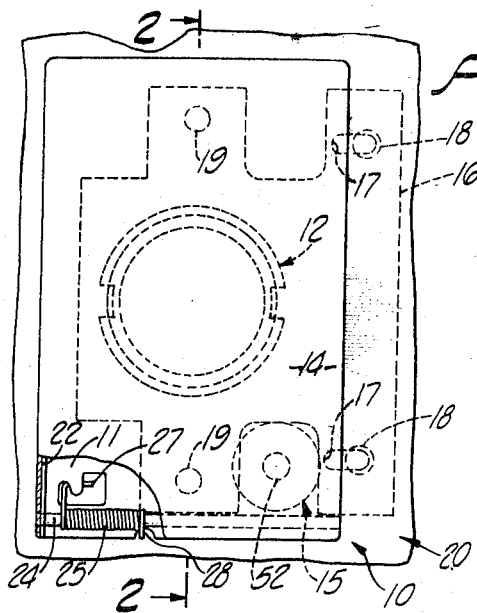
FIG. 1.
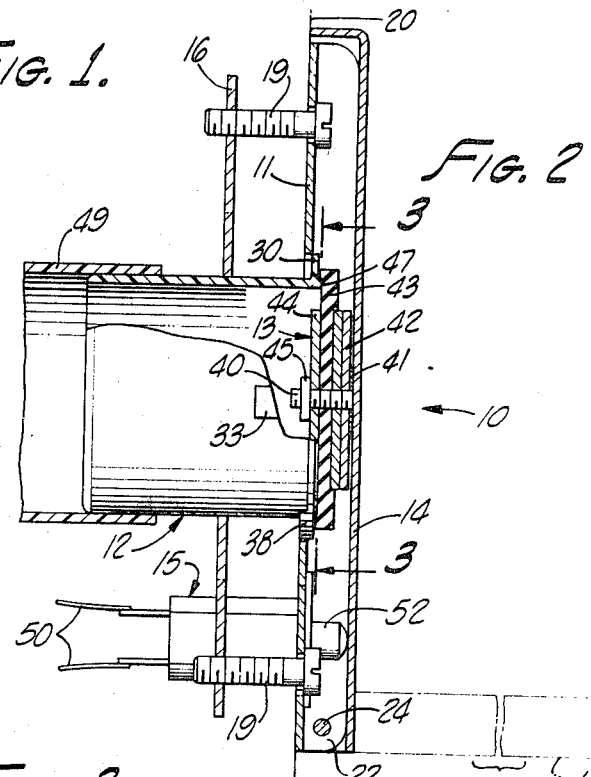
FIG. 2.
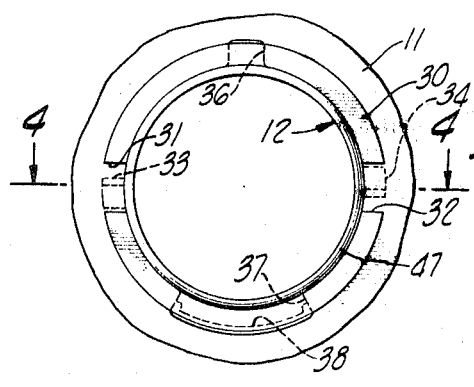
FIG. 3.
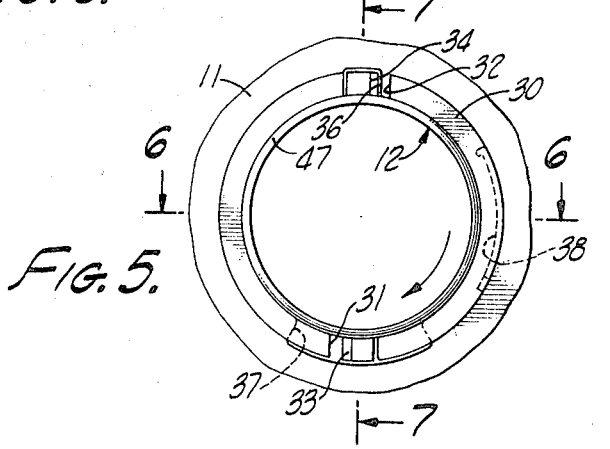
FIG. 5.
FIG. 4.
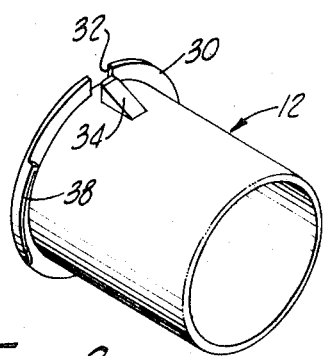
FIG. 8.
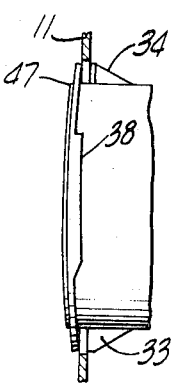
FIG. 7.
FIG. 6.

INLET VALVE ASSEMBLY FOR PNEUMATIC SYSTEM

The invention inlet valve assembly is characterized by its simplicity, small number of components, concealment of all fasteners and unsightly components, and the provision of a flexible valve member having self-aligning positive seating characteristics. The valve seat is provided at the end of a tubular sleeve held assembled to the mounting plate by self-locking keeper tangs. The appearance cover is hinged to one marginal edge of the mounting plate and has a flexibly supported valve member secured to the underside thereof for seating engagement with the valve seat and is formed to conceal all other components of the assembly including the mounting screws.

Accordingly it is a primary object of the present invention to provide an improved and superior inlet valve assembly for use to control the air inlet of a pneumatic system.

Another object of the invention is the provision of a simplified inlet valve system for installed suction cleaner systems.

Another object of the invention is the provision of an inlet valve assembly quickly fabricated from a minimum number of components some of which are held assembled without need for fasteners or tools.

These and other more specific objects will appear upon reading the following specification and claims and upon considering in connection therewith the attached drawing to which they relate.

Referring now to the drawing in which a preferred embodiment of the invention is illustrated:

FIG. 1 is a front elevational view, partly in section, of a preferred embodiment of the valve assembly installed in a wall;

FIG. 2 is a cross sectional view on an enlarged scale taken along line 2—2 on FIG. 1;

FIG. 3 is a fragmentary view taken along line 3—3 on FIG. 2;

FIG. 4 is a cross sectional view taken along line 4—4 on FIG. 3;

FIG. 5 is a view similar to FIG. 3 but showing the inlet sleeve in a partially installed position in the mounting plate;

FIG. 6 is a cross sectional view taken along line 6—6 on FIG. 5;

FIG. 7 is a cross sectional view taken along line 7—7 on FIG. 5; and

FIG. 8 is a perspective view of the valve seat member as viewed from its inner end.

Referring more particularly initially to FIGS. 1 and 2, there is shown an illustrative embodiment of the invention valve assembly designated generally 10. The principal components of this assembly include a mounting plate 11, a tubular inlet and valve seat member 12, a valve sub-assembly 13, an appearance cover 14 and a control switch 15. The assembly also may include a mounting bracket 16 having elongated openings 17 by which the bracket can be secured by screws 18 to wall studs or other structures, not shown. In FIG. 2, bracket 16 is illustrated as mounted directly against the edge of the stud or the like building structure whereas mounting plate 11 for the valve assembly usually bears against the wall covering, such as the plaster indicated at 20. Plate 11 is held in this position by mounting screws 19 extending into threaded openings formed in bracket 16.

Mounting plate 11 has upturned flanges 22 along its opposite edges. The lower end portions of these flanges are utilized to support hinge pin 24 for cover 14. A strong torsion spring 25 (FIG. 1) encircles the hinge pin with one end 27 anchored to plate 11 and the other end 28 bearing against the lower edge of the cover in a manner to urge it firmly to its closed position with its inturned edges normally bearing against the room wall thereby fully concealing mounting plate 11.

Tubular sleeve 12 is molded in one piece from suitable material such as a strong rigid thermoplastic material. Its forward or inlet end is provided with a narrow slightly flexible radial flange 30 formed with a pair of relatively narrow slots 31, 32 diametrically opposite one another. These notches overlie a pair of wedge-shaped keeper lugs 33, 34 having their outer radial ends spaced from the rear face from flange 30 by the thickness of mounting plate 11.

Referring to FIGS. 3 and 5, it is pointed out that mounting plate 11 has a central circular opening having a loose fit with the cylindrical outer surface of sleeve 12. One edge of this opening is notched at 36 to receive one of the locking lugs 33 and the diametrically opposed edge of the opening has a long arcuate notch 37 slightly greater in length than a very shallow keeper lug 38 projecting rearwardly from the inner face of flange 30.

The assembly of sleeve 12 to its supporting opening in mounting plate 11 is accomplished as follows. The first step is to insert the inner unflanged end of the sleeve through the hole in the mounting plate from the room side of the plate with keeper lugs 33,34 aligned with openings 36 and 37. As shown in FIGS. 5–7, lug 34 is aligned with opening 36 and lug 33 is located centrally of the long arcuate notch 37. The locking engagement of the lugs with the mounting plate is then accomplished by pressing inwardly on the outer end of sleeve 12 causing the right hand side of flange 30 to be flexed outwardly as is indicated in FIGS. 6 and 7. This is because the low-height locking lug 38 along the rim edge of flange 30 will bear against the outer surface of mounting plate 11. While the sleeve is being pressed inwardly in this manner it is rotated clockwise, as is indicated by the arrow in FIG. 5, causing first lug 34 and then lug 33 to engage against the rear rim edge of the opening in the mounting plate 11. The operator continues to rotate the sleeve clockwise for a quarter turn in which position the locking lug 38 will be aligned with and will drop into the long notch 37 and thereby positively locking the sleeve against counter rotation. When so properly assembled the sleeve will be in the position shown in FIG. 3 with lug 38 exactly seated in notch 37, and with the keeper lugs 33,34 disposed behind the locking plate as is best illustrated in FIGS. 3 and 4 to prevent axial displacement of the sleeve As is made clear in FIG. 7, one end of keeper lug 38 is substantially normal to the adjacent face of flange 30 whereas its opposite end is acutely inclined to this surface and permits a person familiar with the construction to disassemble the parts by applying sufficient torquing force to member 12 to disengage the lug 38 from notch 37 by cam action.

The valve sub-assembly 13 comprises a threaded mounting stud 40 spot welded to the interior central surface of cover 14. Loosely mounted over this stud is a washer 41, a pair of discs 42, a considerably larger disc of soft rubber 43, and a pressure plate 44 all held in assembled position on stud 40 by a keeper 45. The outer rim edge 47 of sleeve 12 provides a valve seat against which the resilient valve member 43 seats in the closed position of cover 14. When the cover is swung to its open position, as is indicated in dot and dash lines in FIG. 2, the valve assembly is carried with it allowing full and unhampered access to the outer inlet end of sleeve 12. The inner end of this sleeve fits into a tube 49 of the pneumatic system and is sealed thereto in any suitable manner, as by adhesive, or it may simply have a close press and friction fit. When the cover is open, the inlet end of a suction cleaner hose can be inserted into sleeve 12 where it is frictionally retained supplemented by the low pressure condition existing in the cleaning system.

Valve assembly 10 also preferably includes a push button switch 15 having lead wires connected to suitable controls for the suction cleaning system. A reciprocating control button 52 is engaged by the cover as the latter moves to its closed position thereby opening the switch and de-energizing the suction cleaning system. However, upon opening of the cover the spring pressed control button 52 moves outwardly closing the switch and starting the suction cleaner.

While the particular inlet valve assembly for pneumatic system herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as defined in the appended claims.

I claim:

1. An inlet valve assembly for a pneumatic system or the like, said assembly having a mounting member provided with a large area opening having a plurality of notches spaced about the edge thereof, a flanged tubular fitting having a loose fit in said opening and including radially projecting keeper means sized for assembly through a plurality of said notches and axially spaced from the flange on said tubular fitting by a distance at least as great as the thickness of said mounting member and cooperating with said flange to hold said tubular fitting assembled within said opening when said fitting is rotated to misalign said keeper means with the notches in the edge of said opening, the face of said flange adjacent the surface of said mounting member including a low-height axial projection means extending circumferentially of said flange and positioned to seat in one of said notches and to engage the edge thereof and cooperating with said keeper means and the edge of one of said notches to prevent counter rotation of said tubular fitting about its axis, at least one of said flanges and said member being flexible, and valve means movably supported on said mounting member for movement into and out of seating engagement with one end of said tubular fitting.

2. A valve assembly as defined in claim 1 characterized in that said flange is relatively thin and flexible and has a radial width at least approximating the radial depth of said notch so as to conceal said notch in the assembled position of said fitting to said mounting plate.

3. A valve assembly as defined in claim 2 characterized in that said tubular fitting is formed in one unitary piece from molded plastic material.

4. A valve assembly as defined in claim 1 characterized in that said low-height projection means is circumferentially spaced from said keeper means thereby to assure that said tubular fitting will be locked in assembled position only when said keeper means is rotated a predetermined distance out of alignment with said notch in the edge of said opening.

5. A valve assembly as defined in claim 1 characterized in that one of said notches is substantially wider than any other notch.

6. A valve assembly as defined in claim 1 characterized in that one of said notches is substantially wider than any other notch, and said low-height projection means having its remote edges spaced apart to engage an adjacent edge of said wider notch when said tubular fitting is in its proper assembled position.

7. A valve assembly as defined in claim 1 characterized in that said valve means is mounted on the interior side of an appearance cover plate, and hinge means pivotally connecting said cover plate to said mounting plate.

8. A valve assembly as defined in claim 7 characterized in the provision of torsion spring means urging said cover plate pivoted to closed position with said valve means seated against the adjacent end of said tubular fitting.

9. A valve assembly as defined in claim 1 characterized in that the low-height axial projection means has a shoulder generally normal to said flange at one end thereof and a shoulder inclined acutely to the adjacent radial face of said flange at its other end.

* * * * *